United States Patent
Horiike et al.

(10) Patent No.: US 7,993,082 B2
(45) Date of Patent: Aug. 9, 2011

(54) ROUGHING INSERT AND ROUGHING END MILL

(75) Inventors: Nobukazu Horiike, Tsukuba (JP); Jun Kitajima, Tsukuba (JP)

(73) Assignee: Mitsubishi Materials Corporation, Tokyo (JP)

( * ) Notice: Subject to any disclaimer, the term of this patent is extended or adjusted under 35 U.S.C. 154(b) by 141 days.

(21) Appl. No.: 12/440,845

(22) PCT Filed: Sep. 13, 2007

(86) PCT No.: PCT/JP2007/067851
§ 371 (c)(1),
(2), (4) Date: Mar. 11, 2009

(87) PCT Pub. No.: WO2008/032788
PCT Pub. Date: Mar. 20, 2008

(65) Prior Publication Data
US 2010/0003089 A1 Jan. 7, 2010

(30) Foreign Application Priority Data

Sep. 13, 2006 (JP) .................................. 2006-248174
Oct. 31, 2006 (JP) .................................. 2006-295907

(51) Int. Cl.
*B26D 1/00* (2006.01)
*B23C 5/02* (2006.01)
(52) U.S. Cl. ......................................... 407/113; 407/42
(58) Field of Classification Search .................... 407/40, 407/42, 51, 61, 113
See application file for complete search history.

(56) References Cited

U.S. PATENT DOCUMENTS

| 5,944,456 | A  | * | 8/1999  | Shirley et al. | ................. | 407/42  |
| 6,811,359 | B2 | * | 11/2004 | Craig          | ................. | 407/35  |
| 6,913,426 | B2 | * | 7/2005  | Horiike et al. | ................. | 407/113 |
| 7,275,896 | B2 | * | 10/2007 | Nudelman       | ................. | 407/114 |

FOREIGN PATENT DOCUMENTS

| CN | 87205072 U    | 4/1988  |
| FR | A5-2183362    | 12/1973 |
| GB | A-1207782     | 10/1970 |
| JP | 5369892       | 6/1978  |
| JP | 55-179719     | 12/1980 |
| JP | 08-001426     | 1/1996  |
| JP | 08-001427     | 1/1996  |
| JP | 2003-251516   | 9/2003  |
| JP | 2006-239830   | 9/2006  |
| WO | WO-A1-2006/035910 | 4/2006 |

OTHER PUBLICATIONS

European Search Report mailed Nov. 19, 2010 for the corresponding European application No. 07807258.4.

* cited by examiner

*Primary Examiner* — Will Fridie, Jr.
(74) *Attorney, Agent, or Firm* — Leason Ellis LLP

(57) ABSTRACT

This roughing insert is provided with an insert body, and a waveform cutting edge which is formed on an intersecting ridge line portion between a rake face and a flank face of the insert body, and which undulates along this intersecting ridge line portion. The waveform cutting edges are formed such that a portion thereof has a smaller wavelength than the remaining portion thereof.

10 Claims, 11 Drawing Sheets

US 7,993,082 B2

ROUGHING INSERT AND ROUGHING END MILL

CROSS-REFERENCE TO PRIOR APPLICATION

This is the U.S. National Phase Application under 35 U.S.C. §371 of International Patent No. PCT/JP2007/067851 filed Sep. 13, 2007, which claims the benefit of Japanese Patent Application No. 2006-248174 filed Sep. 13, 2006 and Japanese Patent Application No. 2006-295907 filed on Oct. 31, 2006. The International Application was published in Japanese on Mar. 20, 2008 as International Patent Application No. WO/2008/032788 under PCT Article 21(2), and all preceding applications are incorporated herein in their entirety.

TECHNICAL FIELD

The present invention relates to a roughing insert which is provided with a waveform cutting edge and is used to perform rough processing on a piece of work, and to a removable insert type of roughing end mill which has this roughing insert mounted on an outer circumference of an end mill body.

BACKGROUND ART OF THE INVENTION

These roughing end mill equipped with replaceable inserts have been proposed, for example, in Patent documents 1 and 2. In these roughing end mills, a plurality of twisted grooves are formed in an outer circumference of a circular column-shaped tool body, and square plate-shaped inserts are fitted inside these twisted grooves with a slight gap between each insert. The inserts are positioned substantially equidistantly in the twisted grooves such that the inserts of each twisted groove cover the gaps between the inserts in the other twisted grooves. Furthermore, in the conventional technology, a removable insert roughing end mill has been described in which the inserts which are fitted at the tip of the distal end of a portion of the twisted groves are formed having elongated cutting edges, and are made to overlap the cutting edges of the inserts at the tip of the distal end of the other twisted grooves. In addition, these inserts are made to overlap the distal ends of the cutting edges of the next insert in the other twisted groove. However, in the roughing end mills described in Patent documents 1 and 2, the inserts themselves are simply square plate-shaped objects having rectilinear cutting edges. Accordingly, the widths of the fragmented chips also match the length of the cutting edges and the size of the gaps between the inserts in the aforementioned twisted grooves. Because of this, it is not possible to sufficiently fragment the chips and reduce resistance, or to soften the bite impact of the cutting edges.

Therefore, in Patent document 3 the inventors of the present invention proposed inserts in which raised portions and recessed portions are formed alternatingly at substantially equal intervals so as to intersect in a cutting edge such that the cutting edge is formed in a waveform shape which undulates up and down when seen in side view and plan view, and a roughing end mill in which these inserts are mounted in mounting seats which are provided equidistantly a predetermined distance apart in one chip pocket (i.e., a chip removal groove), and in mounting seats which are provided in another chip pocket so as to be positioned between the first mounting seats in the axial direction, so that an elongated edge form is formed on the outer circumference of the end mill by the cutting edges of these inserts. Accordingly, according to this type of roughing end mill, when a cutting edge bites into a work piece, the entire length of that cutting edge does not all bite at the same time, and the work piece is bitten into gradually by the respective raised portions of the waveform. In addition, because the chips are cut into smaller fragments than the length of the cutting edges, it is possible to achieve both a sufficient impact softening and resistance reduction, and a greater improvement in the chip processability.

PATENT DOCUMENT 1: Japanese Patent Application, First Publication No. H08-1426
PATENT DOCUMENT 2: Japanese Patent Application, First Publication No. H08-1427
PATENT DOCUMENT 3: Japanese Patent Application, First Publication No. 2006-239830

DETAILED DESCRIPTION OF THE INVENTION

Problems to be Solved by the Invention

However, in a roughing end mill fitted with inserts in which waveform cutting edges are formed such as that described in Patent document 3, if the rotation trajectories of overlapping waveform cutting edges of inserts which are adjacent in the circumferential direction match each other, then identical waveform shapes become transferred onto the processing surface of a work piece. Because of this, it is necessary to make the rotation trajectories different by offsetting the phases thereof or the like. In this case, even if the second and following inserts from the distal end of each chip removal groove are formed as a single type having the same shape and size and having uniform waveform cutting edge phases, the rotation trajectories can be made different from each other by offsetting in the axial direction the mounting seats where these inserts are mounted which are adjacent in the circumferential direction, so that, on the rotation trajectory, the recessed portions of one waveform cutting edge of these inserts which are mounted on these mounting seats are positioned in the raised portions of the other waveform cutting edge thereof, while, conversely, the raised portions of this one waveform cutting edge are positioned in the recessed portions of the other waveform cutting edge.

However, as in the case in Patent documents 1 and 2, if the inserts mounted at the tip of the distal ends of a portion of the chip removal grooves are formed with longer edges than the other inserts, and if the distal ends of these longer edges are lined up with the distal ends of the edges of the inserts at the tip of the distal ends of the other chip removal grooves, and are made to overlap these, and if a portion of the edges also overlap with the next insert of these other chip removal grooves, then, as is the case, for example, in Patent document 1, if four chip removal grooves are provided, and inserts having a long cutting edge and inserts having a small cutting edge are mounted alternatingly at the tips of the distal ends thereof, then at the distal end side of the two long-edged inserts which overlap with the short-edged inserts, the phases of the waveforms formed by the cutting edges are the same as each other, and the rotation trajectory thereof does not match that of the waveforms of the cutting edges of the short-edged inserts which are adjacent thereto in the circumferential direction. However, at the rear end side thereof which is positioned between the short-edged insert at the tip of the distal end and the subsequent insert, it is necessary to make the waveforms of the cutting edges of the two long-edged inserts different from each other on the rotation trajectory.

Accordingly, in cases such as this, three different types of insert are necessary for the inserts mounted at the tip of the distal end of the end mill body. Namely, two inserts of a short-edged type of insert, and one insert each of two types of long-edged insert that are formed such that the portions at the tip of the distal ends of the waveform cutting edges thereof have the same shape, but such that the portions at the rear end of the waveform cutting edges have different shapes that do not match each other on the rotation trajectory. However, because these two types of insert having long cutting edges have shapes which are mutually similar, there is a possibility that inserts of the same type will be mounted in error. In addition, if a mounting error such as this occurs, and the rotation trajectories of the waveform cutting edges coincide in portions on the rear end side of these long-edged inserts, then as is described above, these waveform shapes become transferred just as they are onto the processing surface of a work piece and, notwithstanding the fact that the processing is rough processing, a processing surface having large-sized irregularities is formed and there is a conspicuous deterioration in surface roughness. Moreover, in subsequent finishing processing, a considerable finishing allowance must be set and there are harmful effects on the reduction of cutting resistance and on chip processability.

The present invention was conceived in view of the above described circumstances, and it is an object thereof to provide a roughing insert and a roughing end mill which, as a result of a waveform cutting edge being provided on each individual insert, make it possible to prevent any conspicuous deterioration in surface roughness even if a mounting error occurs particularly when inserts having a long cutting edge length are mounted erroneously on the above described type of roughing end mill, while enabling a sufficient reduction in resistance and improvement in chip processability to be achieved.

Means for Solving the Problem

The roughing insert of the present invention includes: an insert body; and a waveform cutting edges which are formed on an intersecting ridge line portion between a rake face and a flank face of the insert body, and which undulate along this intersecting ridge line portion, wherein each of the waveform cutting edge is formed such that a portion thereof has a smaller wavelength than the remaining portion thereof.

Moreover, the roughing end mill of the present invention includes: an end mill body; and a plurality of roughing inserts which are removably mounted apart from each other in the circumferential direction on an outer circumference of the end mill body which rotates around an axis, wherein at least two of the roughing inserts according to claim 1 are mounted such that the portions of the waveform cutting edges are made to overlap each other in the axial direction.

In the roughing insert of the present invention, because the cutting edge itself which is formed on the insert body is a waveform cutting edge, the chips which are created are cut into tiny fragments while they are being created so that it is possible to achieve both a reduction in cutting resistance and an improvement in chip processability. In addition, because the wavelength of a portion of this waveform cutting edge is smaller than that of the remaining portion thereof, a processing surface having a waveform cross section which is formed by this portion of the waveform cutting edge being transferred thereon also has a wavelength which is smaller than that of the processing surface formed by the remaining portion. Namely, this processing surface is smooth with only small spaces between undulations. Because of this, in the roughing end mill of the present invention in which at least two of these inserts are mounted such that the portions of the waveform cutting edges are made to overlap each other in the axial direction, even if the portions of the waveform cutting edges are made to overlap with the rotation trajectories thereof around the axis being made to coincide, it is possible to limit to a minimum any deterioration in the surface roughness of a processing surface being formed.

Accordingly, using the above described insert, for example, as an insert having a long cutting edge length which is mounted at the tip of the distal end of the above described end mill body, if the above described remaining portion of the waveform cutting edge thereof is positioned at the distal end side so as to overlap with an insert having a short cutting edge length, and the above described portion of this waveform cutting edge is positioned at the rear end side, then even if a mistake is made in the mounting such that this portion of the waveform cutting edge at the rear end side traces the same rotation trajectory around the axis, it is possible to prevent any conspicuous damage to the surface roughness of the processing surface. Naturally, in the above described roughing end mill, if the inserts are correctly mounted and portions of these waveform cutting edges are made to overlap without the rotation trajectories thereof around the axis coinciding with each other, then a processing surface left uncut by the recessed portions of the waveform cutting edge on the rotation direction side of the end mill body is cut away by the raised portions of the waveform cutting edge on the rearward side in the rotation direction, and it is possible to cut a processing surface even more smoothly and obtain an improvement in surface roughness.

Here, in the above described waveform cutting edge, if the wavelength of the portion thereof is formed as half the wavelength of the remaining portion thereof, then even if a mounting error occurs such as is described above, it is possible to make the intervals between undulations in the processing surface which have been transferred thereon by the portion of the waveform cutting edge substantially equivalent to the intervals between undulations in the processing surface which have been transferred thereon after the raised portions have cut off the processing surface which has been left uncut by the recessed portions of the remaining portion of the waveform cutting edge. Moreover, in this waveform cutting edge, by making the amplitude of the portion smaller than that of the remaining portion, it is possible to reduce the depth of the recessed portions left uncut by a portion of the cutting edge when a mounting error has been made, and a further improvement in the precision of the processing surface can be achieved. Note that, in this case as well, by forming the waveform cutting edge such that the amplitude of the portion thereof is half the amplitude of the remaining portion, when a mounting error has been made, it is possible to make the depth of the recessed portions in a processing surface which are formed by the portion of the waveform cutting edge substantially equivalent to the depth of the recessed portions in a processing surface which are formed by the remaining portion.

It should be noted that while inserts having a long cutting edge length and inserts having a short cutting edge length are mounted alternatingly in the circumferential direction at the tip of the distal end of an end mill body, and the distal end sides of each long cutting edge insert which overlap the short cutting edge inserts have waveform phases formed by the waveform cutting edges thereof which are mutually equivalent, when the phases are made different on the rear end side of the short cutting edge inserts such that the waveform rotation trajectories thereof do not coincide, then when, for example, an insert body is formed with the rake face thereof formed in a rectangular, flat plate-shape and waveform cutting edges having a long cutting edge length are formed on the long sides thereof, and when the above described waveform cutting edges are formed respectively at rotationally symmetrical positions at predetermined angular intervals (of 180° in this case) around a reference line of the insert body (the center line of the rake face in this case), if these waveform cutting edges are also formed so as to be rotationally symmetrical with each other, then, as is described above, three different types of insert are necessary at the tip of the distal end of the end mill body. Namely, one type of insert having a short cutting edge length, and two types of insert having a long cutting edge length that are formed such that the portions at the distal end side of the waveform cutting edges have the same shape, but such that the portions at the rear end side of the waveform cutting edges have different shapes so that the rotation trajectories thereof do not coincide with each other.

However, if the number of types of insert to be mounted on an end mill body is increased in this manner, then considerable costs and labor are required for the manufacturing and control thereof, or if it is noticed that the above described type of mounting error has occurred, then the wrong insert needs to be replaced in order to fix the mounting error. Because of this, there is a possibility of the mounting clamp screw becoming lost when it is removed, or of the insert being unintentionally dropped and breaking or becoming contaminated or lost. Therefore, in this manner, when the above described waveform cutting edges are formed at rotationally symmetrical positions on the insert body at predetermined angular intervals around the reference line of the insert body, then by forming these rotationally symmetrically positioned waveform cutting edges such that portions thereof are asymmetrical and do not match each other when the insert body is rotated by the predetermined angular intervals around the reference line, it is possible using a single type of insert to make the waveform cutting edges different shapes such that, when they are mounted on the end mill body, the rotation trajectories of the portions on the rear end sides thereof do not coincide with each other, and it is possible to reduce the number of insert types.

Moreover, in this case, by forming the above described portions of the waveform cutting edges which are positioned rotationally symmetrically to each other such that, when the insert body is rotated by the predetermined angular intervals around the reference line, the wavelengths and amplitudes thereof are mutually equivalent while the phases thereof are mutually offset, it is possible to promote stable cutting and achieve uniformity in cutting resistance and the like between inserts when they are mounted on a roughing end mill as is described above, and to form an even smoother processing surface. Note that the amount of phase offset at this time may be set in accordance with the number of waveform cutting edges formed on the insert body, the size of the end mill body when this is mounted on a roughing end mill, or the number of inserts being mounted, however, if, for example, the phase is offset by half the above described wavelength, then when the above described asymmetrical portions of the waveform cutting edges are made to overlap on a rotation trajectory, it is possible to reliably position the raised portions of one in the recessed portions of the other and the recessed portions of one in the raised portions of the other, and thereby achieve a smoothing of the processing surface.

In addition, when the above described roughing insert is mounted together with an insert having a short cutting edge length on the tip of the distal end of a roughing end mill, as is described above, then when the cutting edge of this short cutting edge insert is also a waveform cutting edge, in the rotationally symmetrically positioned waveform cutting edges, when the insert bodies are rotated around the reference line by the predetermined angular intervals, the above described remaining portions are formed so as to be symmetrical and mutually coincide, and the rotation trajectories of the waveform cutting edges of the short cutting edge inserts as well as the phases thereof are mutually offset. As a result, it becomes possible to form a smooth processing surface even in the overlapping portions of these inserts.

Advantageous Effects of the Invention

In this manner, according to the roughing insert of the present invention, it is possible to achieve a reduction in cutting resistance and an improvement in chip processability by means of a waveform cutting edge formed on an insert body. In addition, in a portion of a waveform cutting edge in which the amplitude of the wave has been made smaller, even if the worn insert is mounted by mistake, it is possible to prevent any conspicuous deterioration in the surface roughness of the processing surface of a work piece being formed. Accordingly, according to a roughing insert in which this insert has been mounted, it is not necessary to set a substantial allowance or the like in the finishing processing in portions of the subsequent steps, and it becomes possible to achieve efficient processing.

DESCRIPTION OF THE REFERENCE SYMBOLS

1 . . . End mill body,
2 . . . Chip removal groove,
3 . . . Insert mounting seat,
4 . . . Clamping screw,
11A~11C . . . Insert bodies, 12 ... Rake face,
14 ... Flank face,
15, 15A, 15B ... Cutting edges (waveform cutting edges),
15a ... Acute angle corner cutting edge portion (remaining portion of the waveform cutting edge 15),
15b ... Obtuse angle corner cutting edge portion (portion of the waveform cutting edge 15),
18 ... Groove portion,
18A ... Shallow groove portion,
18B ... Deep groove portion,
19 ... Raised portion,
20 ... Corner portion,
A~C ... Inserts,
O ... Rotation axis of end mill body 1,
T ... Rotation direction of end mill body 1,
S1~S4 ... Insert rows

BEST MODE FOR CARRYING OUT THE INVENTION

Figure 1:
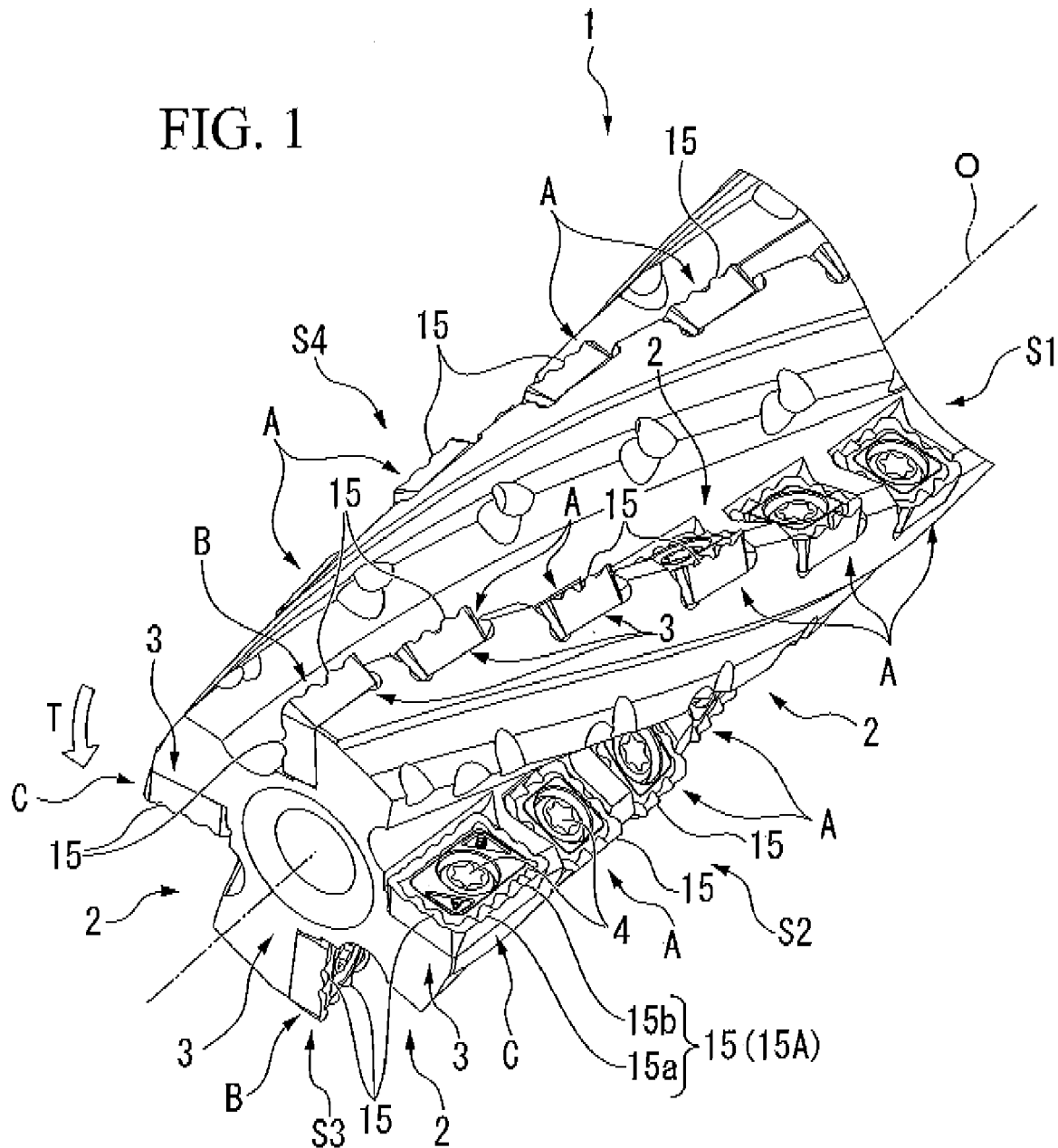
FIG. 1 is a perspective view showing a roughing end mill according to an embodiment of the present invention.
Figure 2:
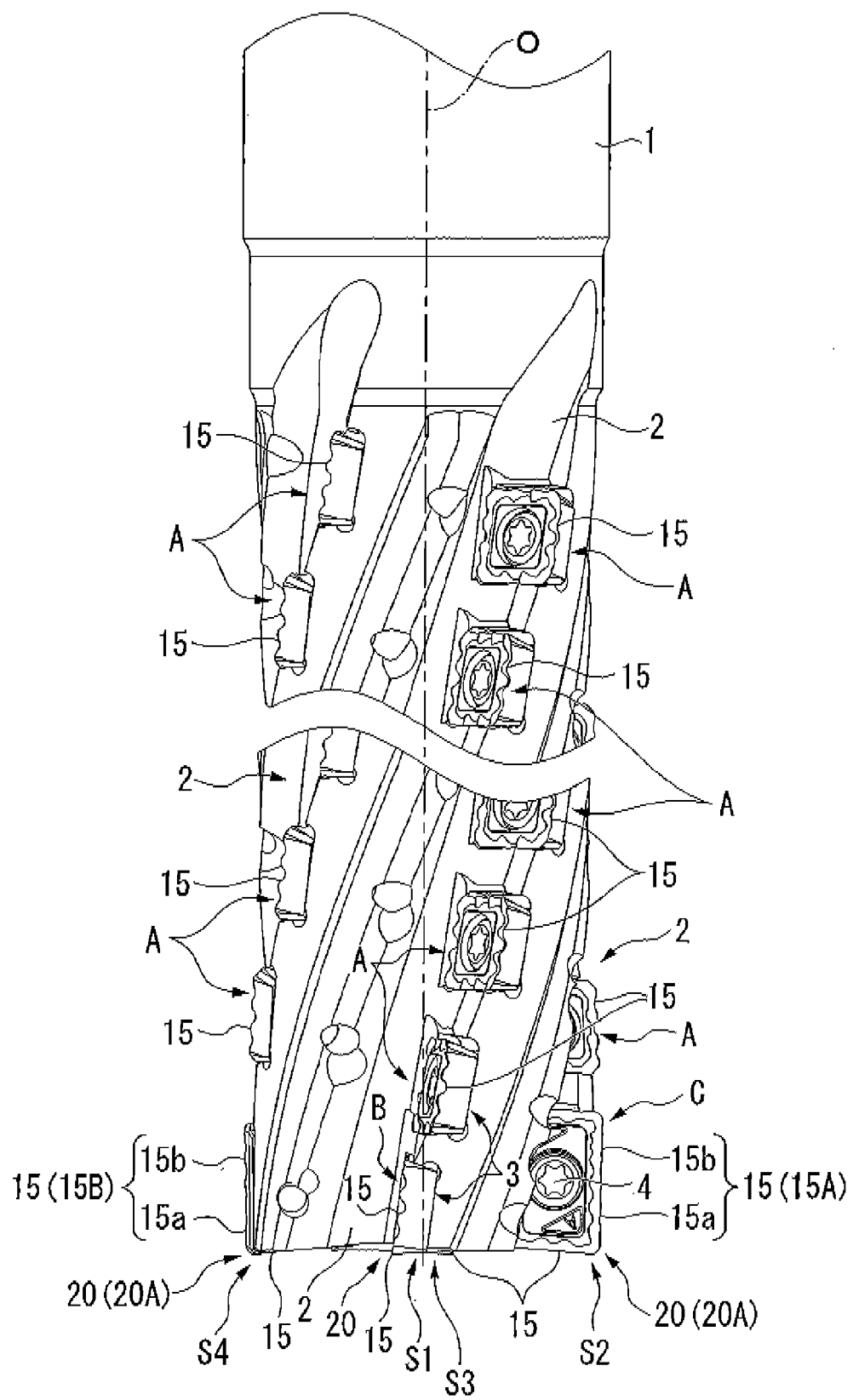
FIG. 2 is a side view of the embodiment shown in FIG. 1.
Figure 3:
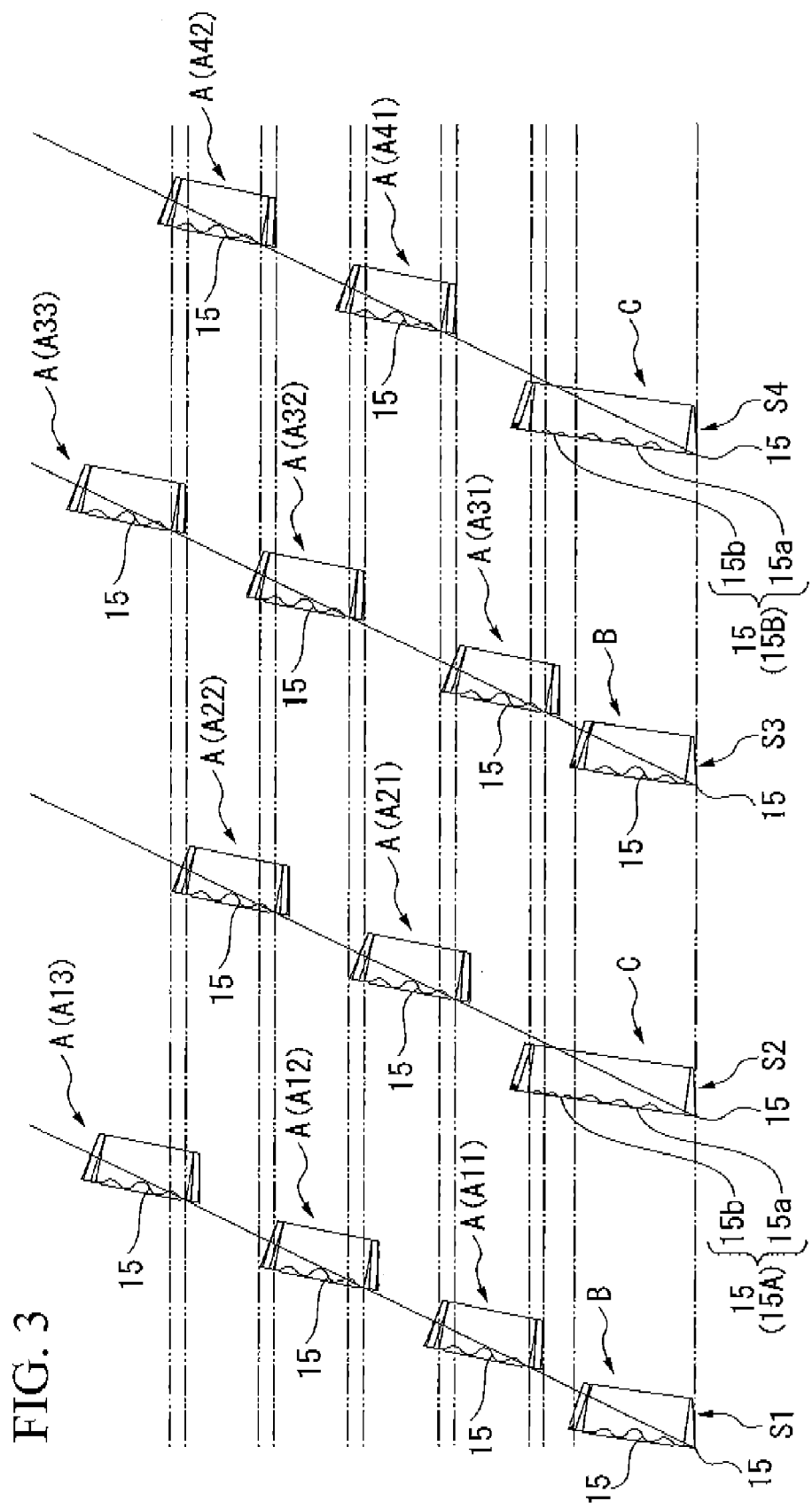
FIG. 3 is an expanded view illustrating a placement of inserts A to C of the embodiment shown in FIG. 1.
Figure 4:
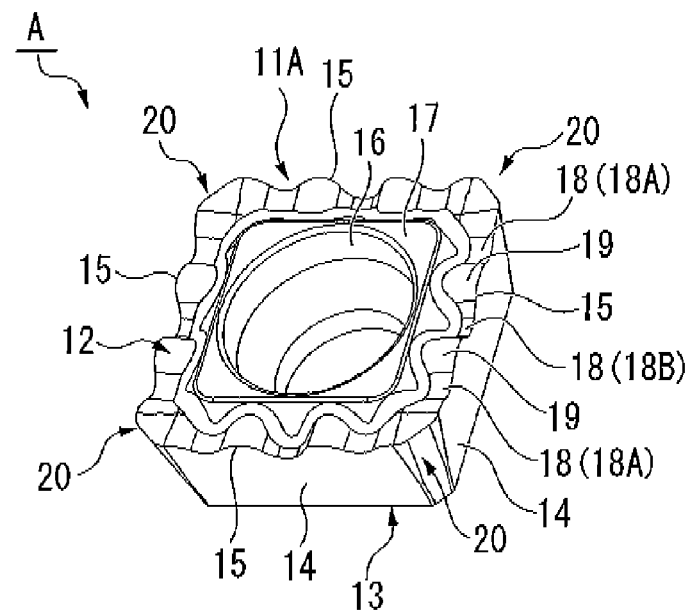
FIG. 4 is a perspective view of the insert A of an embodiment of the present invention which is placed in the roughing end mill of the embodiment shown in FIG. 1.
Figure 5:
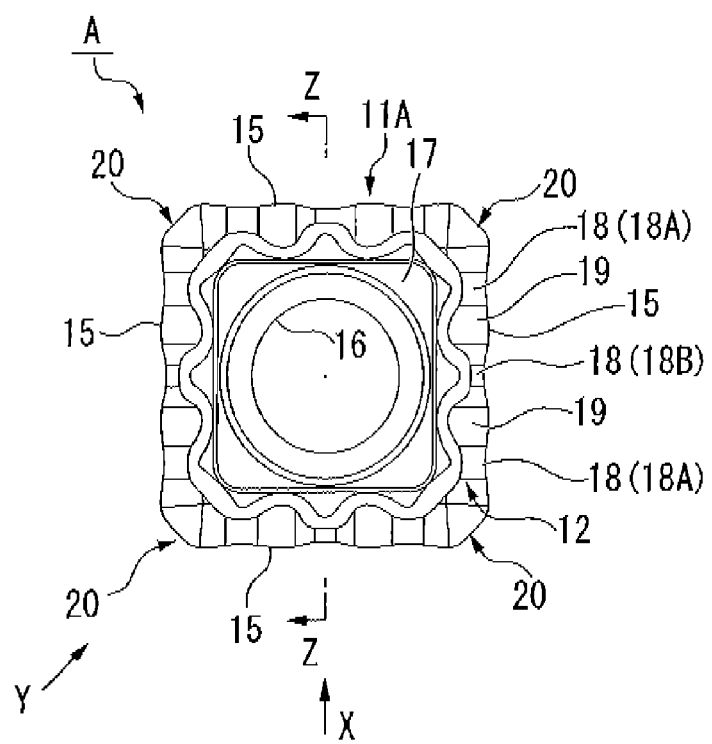
FIG. 5 is a plan view of the insert A shown in FIG. 4.
Figure 6:
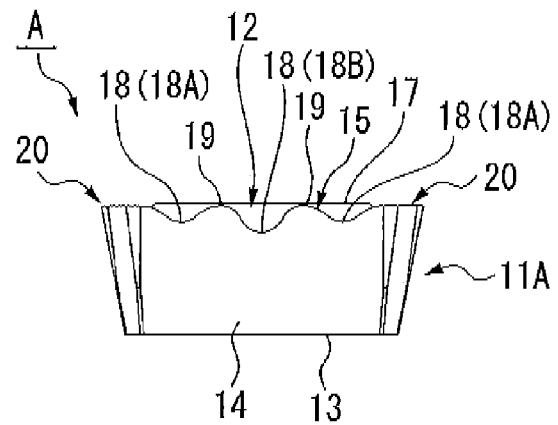
FIG. 6 is a side view as seen from the direction of an arrow X in FIG. 5.
Figure 7:
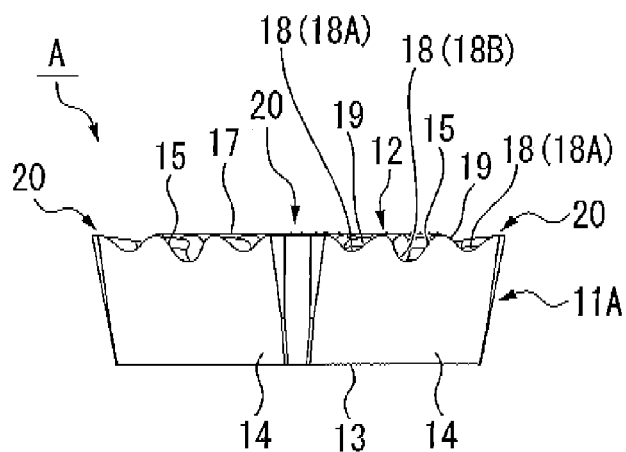
FIG. 7 is a side view as seen from the direction of an arrow Y in FIG. 5.
Figure 8:
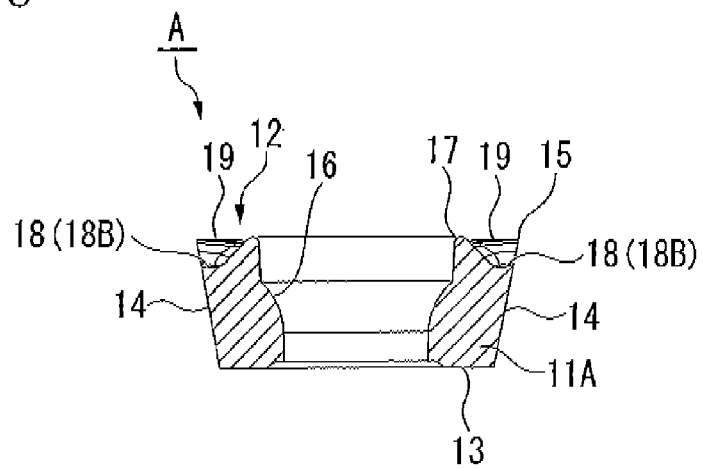
FIG. 8 is a cross-sectional view taken along a line Z-Z in FIG. 5.
Figure 9:
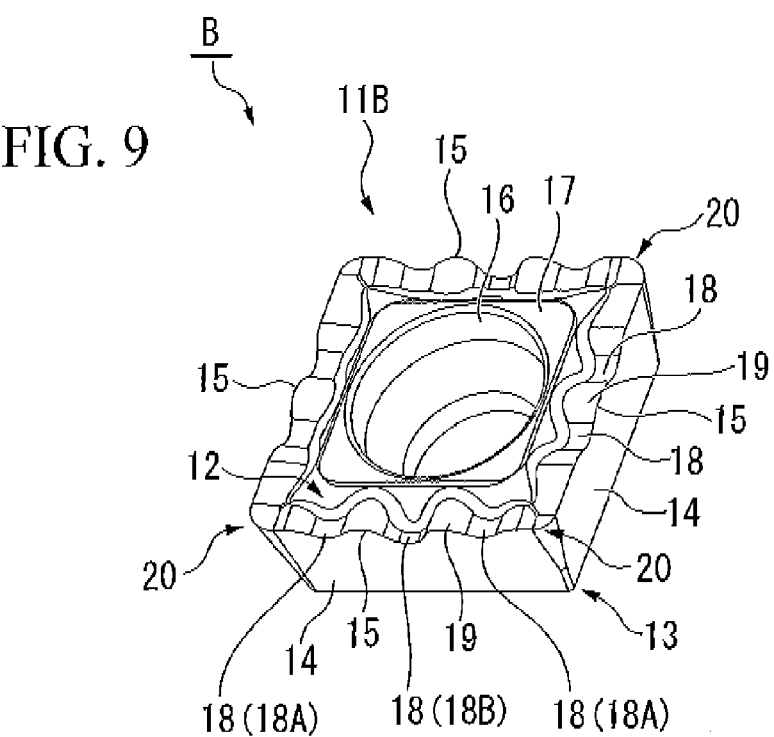
FIG. 9 is a perspective view of the insert A which is placed in the roughing end mill of the embodiment shown in FIG. 1.

FIG. 1 through FIG. 3 show a roughing end mill of an embodiment of the present invention. In this roughing end mill, the inserts A shown in FIG. 4 through FIG. 8, the inserts B shown in FIG. 9 through FIG. 13, and the inserts C shown in FIG. 14 through FIG. 19 are removably mounted. Of these, the inserts C shown in FIG. 14 through FIG. 19 correspond to the roughing insert of an embodiment of the present invention. Note that the other inserts A and B are also roughing inserts having a waveform cutting edge.

The roughing end mill of the present embodiment has an end mill body 1 which is formed from steel or the like with a substantially circular column-shaped outer configuration centered on an axis O. A plurality (four in the present embodiment) of spiral-shaped chip removal grooves 2 are formed equidistantly in the circumferential direction on an outer circumference of a distal end portion of the end mill body 1. These chip removal grooves 2 are twisted around the axis O moving from the distal end of the end mill body 1 towards the rear end side in the direction of the axis O (i.e., in an upwards direction in FIG. 2) towards the rear in a rotation direction T in which the end mill body 1 rotates during a cutting process. A plurality of insert mounting seats 3 which are placed apart from each other in the direction of the axis O are formed in a wall surface of each chip removal groove 2 which faces in the aforementioned rotation direction T. The aforementioned inserts A through C are removably mounted by means of clamping screws 4 in these insert mounting seats 3.

These inserts A through C are provided with square plate-shaped insert bodies 11A, 11B, and 11C which are formed from a hard material such as cemented carbide. One of two square surfaces which face in the thickness direction of the flat plate formed by each of these insert bodies 11A, 11B, and 11C is formed as a rake face 12, while the other surface is a flat surface which is perpendicular to the aforementioned thickness direction and serves as a seating surface 13 for mounting on an insert mounting seat 3. Four circumferential surfaces which are placed around the periphery of the square surfaces each form flank faces 14. Cutting edges 15 are formed in intersecting ridge portions between the four flank faces 14 and the aforementioned rake face 12. Here, each flank face 14 is formed as a positive flank face which gradually recedes as it moves from the rake face 12 towards the seating surface 13 side. The inserts A through C are thus formed as positive inserts which have a relief angle formed in the cutting edges 15.

Moreover, a mounting hole 16 through which the aforementioned clamping screw 4 is inserted is formed extending in the thickness direction from the center of the rake face 12 to the seating surface 13. In addition the periphery of the aperture portion of the mounting hole 16 in the rake face 12 is formed as a boss surface 17 which is a flat surface which is perpendicular to the thickness direction and which protrudes in the thickness direction beyond the cutting edges 15. The boss surface 17 has substantially the same outer configuration as the rake face 12 of each of the inserts A through C, but is formed at a smaller size than the rake face 12. A plurality of groove portions (i.e., recessed portions) 18 and raised portions 19 which reach as far as the flank faces 14 are formed alternatingly along the cutting edges 15 in the rake face 12 on the outer side of the boss surface 17. As a result of these groove portions 18 and raised portions 19 being formed so as to intersect with the flank faces 14, the cutting edges 15 are formed as waveform cutting edges which undulate in the thickness direction and extend along the intersecting ridge line portion facing in a circumferential direction around the rake face 12. Moreover, because the flank faces 14 are formed as positive flank faces, the cutting edges 15 are formed as waveform cutting edges which also undulate inwards and outwards relative to the rake face 12 when seen in plan view facing the rake face 12 along the aforementioned center line.

Here, the cutting edges 15 at each corner portion 20 of the square rake faces 12 of the respective inserts A through C are formed so as to extend along a single plane which is perpendicular to the thickness direction. The waveform cutting edges are formed by alternating the groove portions 18 and the raised portions 19 in this order starting from these corner portions 20, and the apex point of each raised portion 19 is located on the level of the aforementioned single plane. Moreover, apart from a portion thereof, the waveform cutting edges formed by these groove portions 18 and raised portions 19 have a shape made up of broadly circular arc-shaped concave curves and convex curves which are smoothly continuous. Note that the groove portions 18, the raised portions 19, and the corner portions 20 are inclined where their cross sections intersect with the flank face 14 so as to slope slightly downwards in the thickness direction as they move away from the cutting edges 15 towards the inner side of the rake face 12. Moreover, on the inner side of the rake face 12, a wall surface around the boss surface 17 which intersects with the groove portions 18, raised portions 19, and corner portions 20 is formed as a sloping surface which rises upwards in the thickness direction at a steeper gradient than the slope of the groove portions 18, raised portions 19, and corner portions 20 as it moves inwards until it reaches the boss surface 17.

Of the inserts A through C, firstly, the above described insert A has a substantially square, planar shape and is formed so as to be rotationally symmetrical every 90° around the center line of the mounting hole 16 which forms a reference line for the insert body 11A. The cutting edges 15 of the insert A are made up of three groove portions 18 and two raised portions 19 being placed alternatingly between adjacent corner portions 20. As a result, the cutting edges 15 present a waveform shape having a uniform wavelength and, particularly in the present embodiment, the intervals between the bottommost portions of the groove portions 18 and the topmost portions of the raised portions 19 are mutually equivalent, Furthermore, of these, the groove depth in the thickness direction of the groove portions 18 on the two corner portion 20 sides are mutually the same, and form shallow groove portions 18A which have a shallow groove depth, while the groove portion 18 in the center forms a deep groove portion 18B whose groove depth is deeper than that of the shallow groove portions 18A. Namely, the shallow groove portions 18A and 18B are formed alternatingly, and have different wave amplitudes. Note that the cutting edges 15 of this insert A form chamfered corner edges in the corner portions 20 where the corners of the aforementioned square have been rectilinearly chamfered when seen in plan view.

Figure 10:
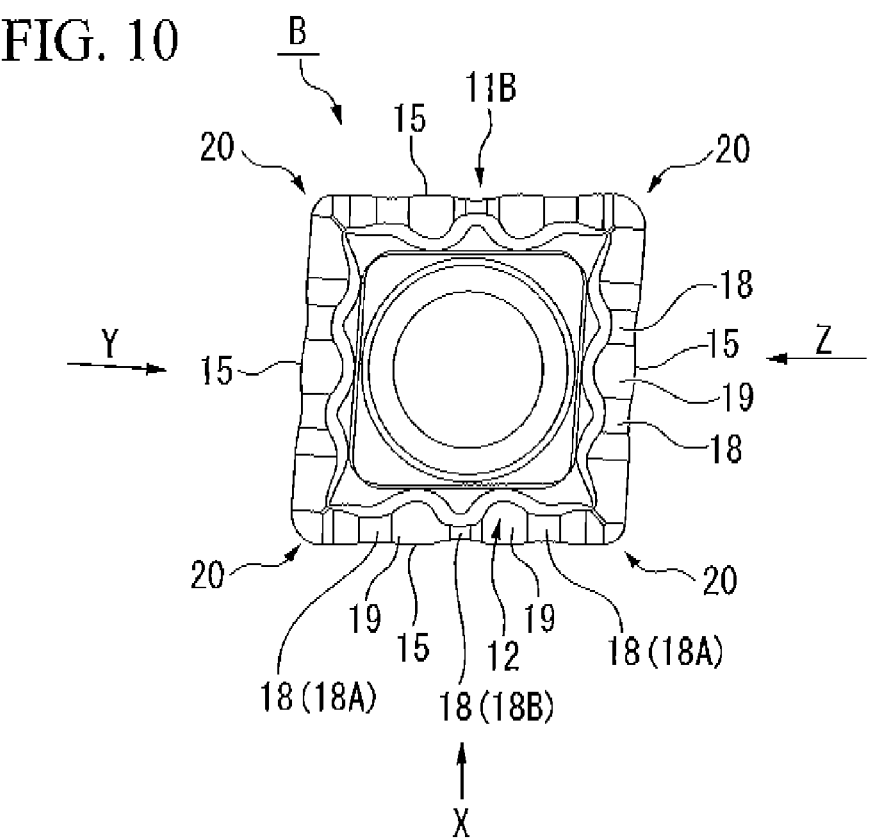
FIG. 10 is a plan view of the insert B shown in FIG. 9.
Figure 11:
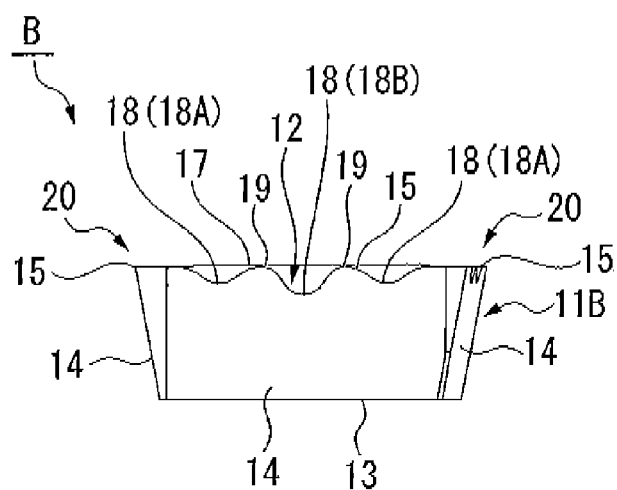
FIG. 11 is a side view as seen from the direction of an arrow X in FIG. 10.
Figure 12:
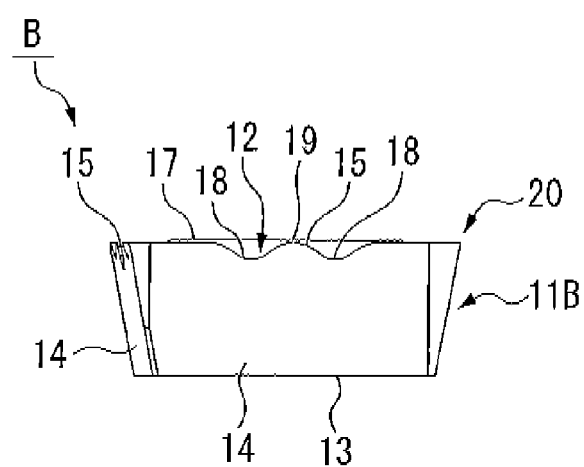
FIG. 12 is a side view as seen from the direction of an arrow Y in FIG. 10.
Figure 13:
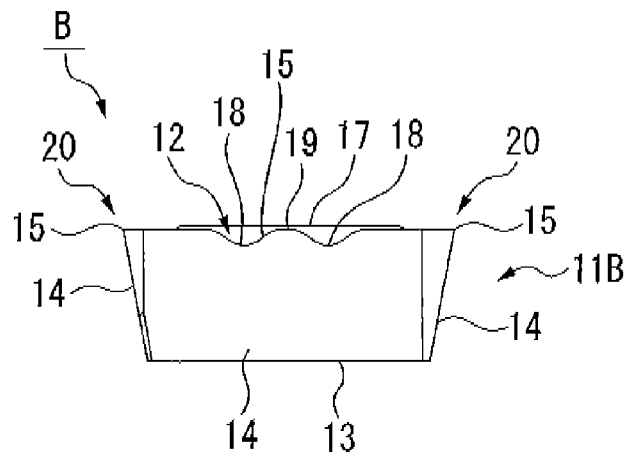
FIG. 13 is a side view as seen from the direction of an arrow Z in FIG 10.
Figure 14:
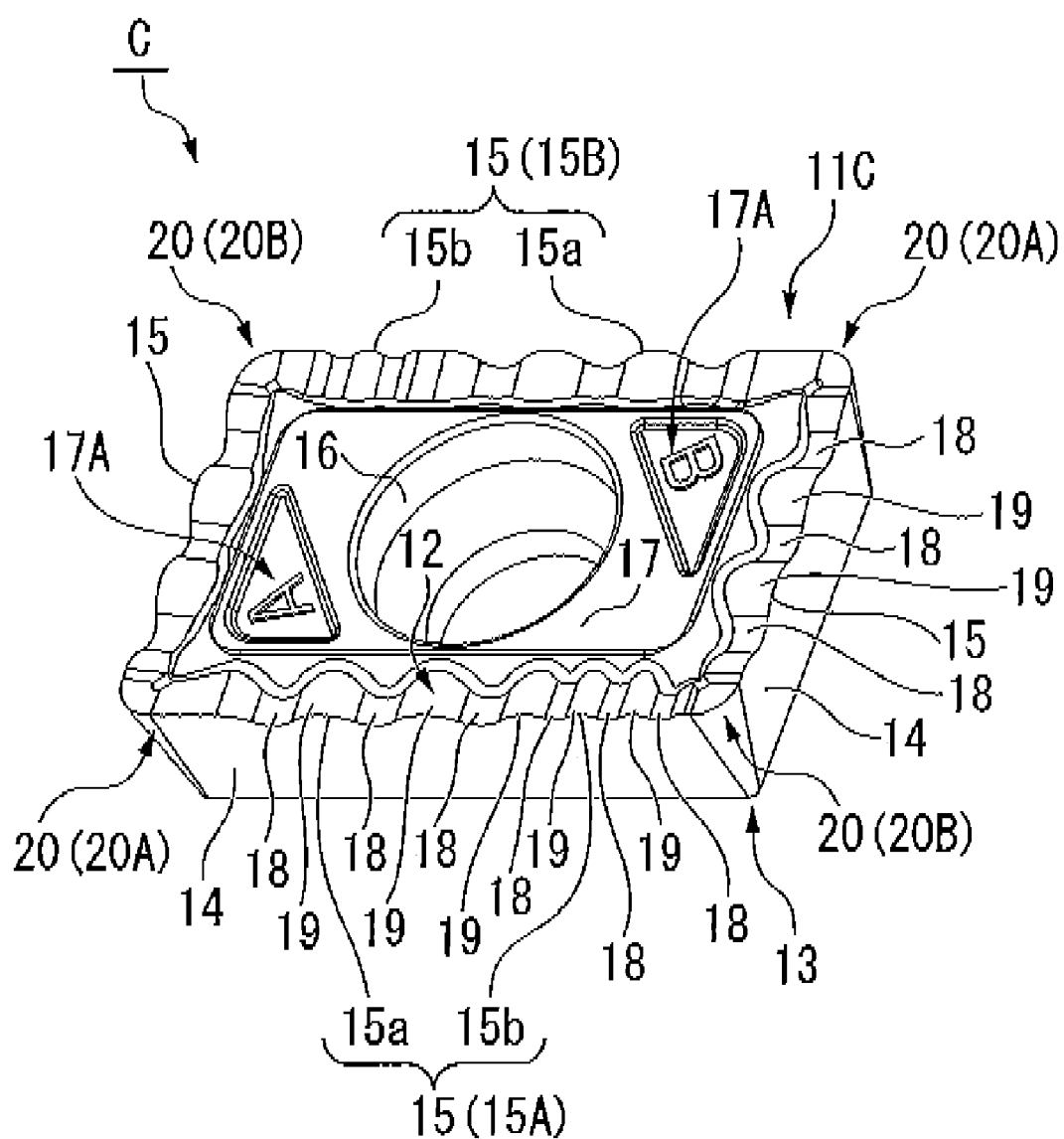
FIG. 14 is a perspective view of the insert C which is placed in the roughing end mill of the embodiment shown in FIG. 1.
Figure 15:
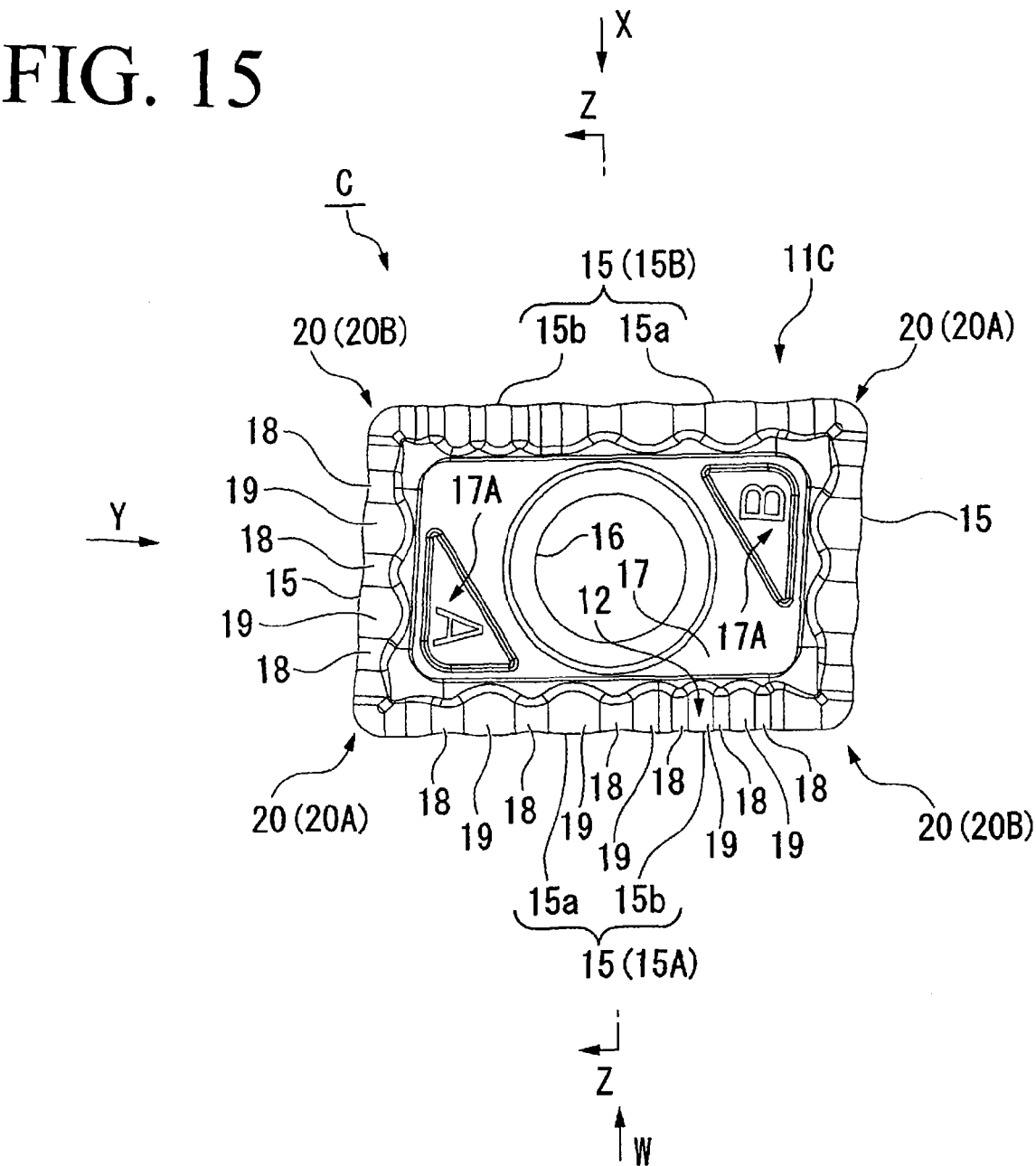
FIG. 15 is a plan view of the insert C shown in FIG. 14.

In contrast, as is shown in FIG. 10 and FIG. 15, the inserts B and C are formed as substantially rhomboid flat plates in which the respective corner portions 20 of the rake face 12 are either slightly acute angles or slightly obtuse angles. However, while the long sides of the parallelogram (i.e., the sides extending in a vertical direction in FIG 10) are slightly longer than the short sides (i.e., the sides extending in a horizontal direction in FIG. 10) in the inserts B, in the inserts C of the present embodiment, the length of the short sides is the same as in the inserts B while, as is shown in FIG. 15, the long sides are longer than those in the inserts B. Note that the gaps between the long sides in both the inserts B and C are the same as each other, and are also the same as the gaps between opposing sides in the inserts A. Furthermore, the respective corner angles in the acute angle corner portions 20A and the obtuse angle corner portions 20B of the corner portions 20 are the same as each other in the inserts B and C. Accordingly, the inserts C have an external shape which is obtained by extending the inserts B in the direction of the long sides thereof, and are formed by long-edged inserts from the inserts which are mounted at the tip of the distal end of the end mill body 1, while in contrast, the inserts B are formed by short-edged inserts.

Of these, the short-edged inserts B are formed so as to be rotationally symmetrical every 180° around the center line of the mounting hole 16 (i.e., so as to have line symmetry) which forms a reference line for the insert body 11B. In the same way as in the inserts A, three groove portions 18 and two raised portions 19 are formed alternatingly between adjacent corner portions 20 on the aforementioned long sides thereof so that waveform cutting edges 15 having a uniform wavelength are formed. Furthermore, the groove portions 18 on the two corner portion 20 sides form shallow groove portions 18A, while the groove portion 18 in the center forms a deep groove portion 18B. In contrast, as a result of two groove portions 18 and one raised portion 19 being formed alternatingly on the short sides at a distance from the adjacent corner portions 20, waveform cutting edges 15 having a uniform wavelength are formed and the groove depths of these groove portions 18 are the same as each other. Namely, the amplitude of the waveform formed by the cutting edges 15 on these short sides is also uniform. Note that the cutting edges 15 in the corner portions 20 of the inserts B and the inserts C form R corner edges in which the corner portions 20 are chamfered as protruding circular arcs when seen in plan view.

In contrast to this, in the inserts C of the present embodiment, waveform cutting edges 15 having the same wavelength and amplitude as the cutting edges 15 formed on the short sides of the inserts B which are provided with three groove portions 18 alternating with two raised portions 19 are formed on the short sides thereof. However, the groove portions 18 on both ends are formed adjacent to the two corner portions 20, so that the phases of the waveforms formed by the cutting edges 15 when the short sides of the inserts B and C are overlapped with each other are mutually offset by half a wavelength. However, the groove portions 18, raised portions 19, and cutting edges 15 which are formed on the pair of short sides of this insert C are rotationally symmetrical in a 180° rotation around the center line of the mounting hole 16 which forms a reference line for the insert body 11C of the relevant insert C.

In contrast, six groove portions 18 and five raised portions 19 are formed alternatingly on the long sides of the inserts C so as to form waveform cutting edges 15, however, the waveform formed by the cutting edge 15 on one long side is different in portions. Specifically, in the inserts C, the wavelength and amplitude differ bordering on the apex portion of the third center raised portion 19. Namely, of the waveform cutting edges 15 formed on these long sides, in an acute angle corner cutting edge portion 15a which is located between the apex portion of the center raised portion 19 which forms a portion of the waveform cutting edge and the acute angle corner portions 20A, compared with an obtuse angle corner cutting edge portion 15b which is located between this apex portion which forms the remaining portion of the waveform cutting edge and the obtuse angle corner portions 20B, the groove depth of the groove portions 18 is deeper and the width of the groove portions 18 and raised portions 19 is also greater. As a result, in the cutting edges 15 of each three wave portion formed between these, the obtuse angle corner cutting edge portions 15b have a smaller wavelength and amplitude than the acute angle corner cutting edge portions 15a, and in the insert C of the present embodiment each one is half as large.

Accordingly, in conjunction with this, the acute angle corner cutting edge portions 15a occupy a greater length of the cutting edges 15 formed on the long sides than do the obtuse angle corner cutting edge portions 15b, and the length from the distal end of the acute angle corner portion 20A of the acute angle corner cutting edge portion 15a to the apex portion of the center raised portion 19 is equal to the length from the distal end of the acute angle corner portion 20A to the boundary thereof with the obtuse angle corner portion 20B of the cutting edge 15 formed on the long side of the above described inserts B. Note that in the respective waveform cutting edges 15 of the acute angle corner cutting edge portions 15a and the obtuse angle corner cutting edge portions 15b which are formed by a plurality of waves (three waves each in the present embodiment), the depths of the groove portions 18 are the same, and the amplitude of the waveforms formed by these cutting edges 15 as well as the wavelength thereof are uniform.

Furthermore, in the inserts C of the present embodiment, the pair of long sides of the parallelogram formed by the rake face are formed non-symmetrically such that, when the insert body 11C is rotated 180°0 around the center line of the mounting hole 16 which forms the aforementioned reference line, the waveforms of one or more portions of the cutting edges 15 formed on these long sides do not match. Here, in the present embodiment, the obtuse angle corner cutting edge portions 15b which form the above described portion of the waveform cutting edges 15 formed on the long sides are formed asymmetrically from each other, while the acute angle corner cutting edge portions 15a which form the remaining portion are formed symmetrically around the center line so as to match each other when the insert body 11C is rotated 180° around the center line.

Furthermore, the wavelength and amplitude of the waveforms of the obtuse angle corner cutting edge portions 15b of the waveform cutting edges 15 formed on the pair of long sides are formed equal to each other and, as is described above, as half those of the acute angle corner cutting edge portions 15a. When the insert body 11C is rotated 180° around the center line so as to superimpose these obtuse angle corner cutting edge portions 15b, they are asymmetrical due to the phases of the waveforms thereof being offset. In the present embodiment, this phase offset amount is equal to half the wavelength of the obtuse angle corner cutting edge portion 15b.

Figure 16:
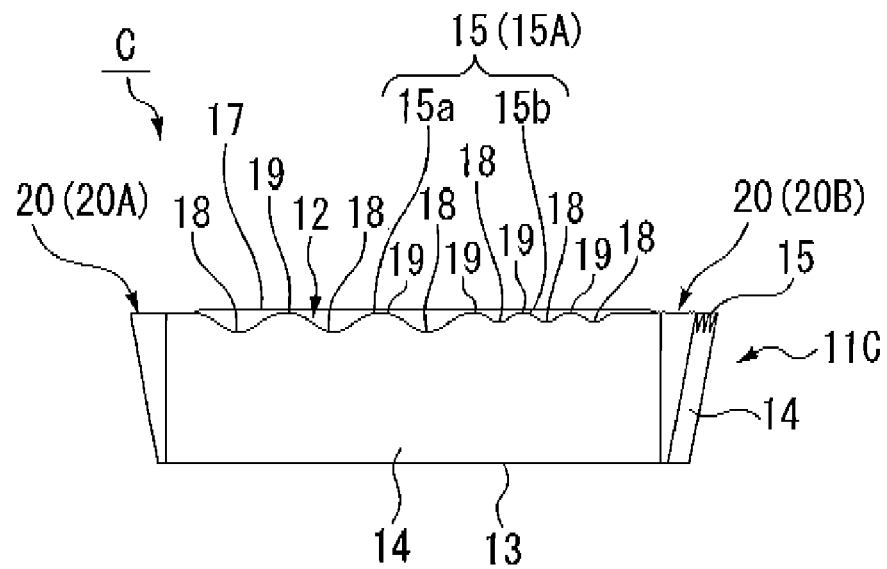
FIG. 16 is a side view as seen from the direction of an arrow W in FIG. 15.

Here, in the insert C of the present embodiment, in order to offset the phases of the obtuse angle corner cutting edge portions 15b in this manner, in the cutting edge 15A formed on the one long side shown at the bottom in FIG. 15 and in FIG. 16, the groove portions 18 of the obtuse angle corner cutting edge portions 15b are formed so as to be continuous with the apex portion of the center raised portion 19 of this cutting edge 15A, and a space is opened up between the groove portion 18 on the obtuse angle corner portion 20B side of this obtuse angle corner cutting edge portion 15b and this obtuse angle corner portion 20B, and a short rectilinear portion is formed extending from the obtuse angle corner portion 20B along the aforementioned single plane.

Figure 17:
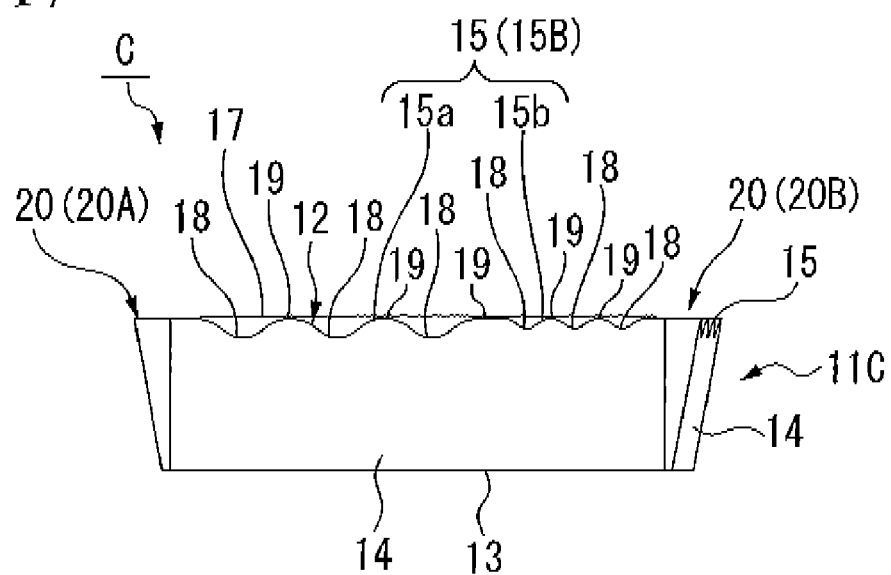
FIG. 17 is a side view as seen from the direction of an arrow X in FIG. 15.
Figure 18:
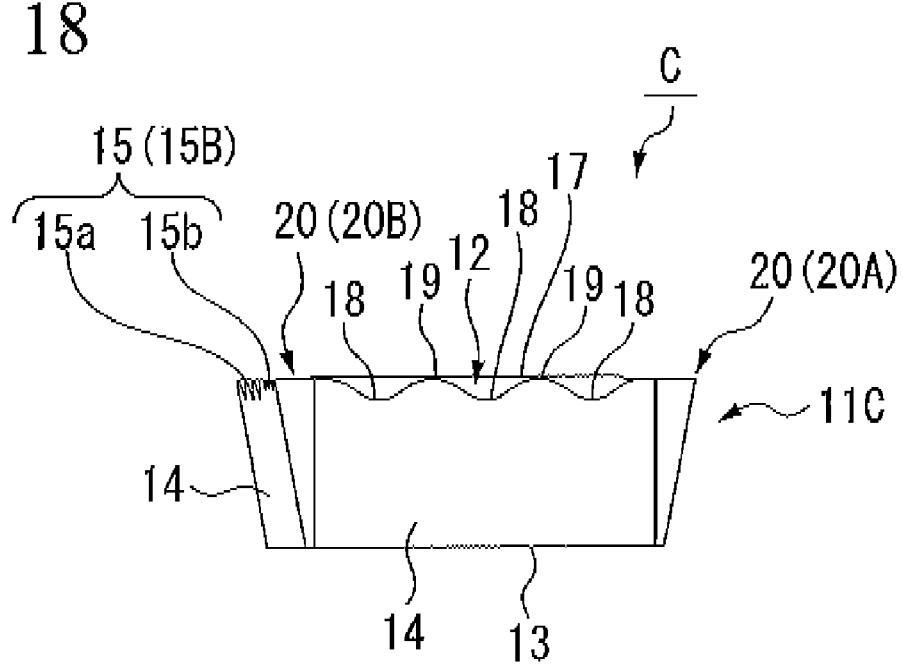
FIG. 18 is a side view as seen from the direction of an arrow Y in FIG. 15.
Figure 19:
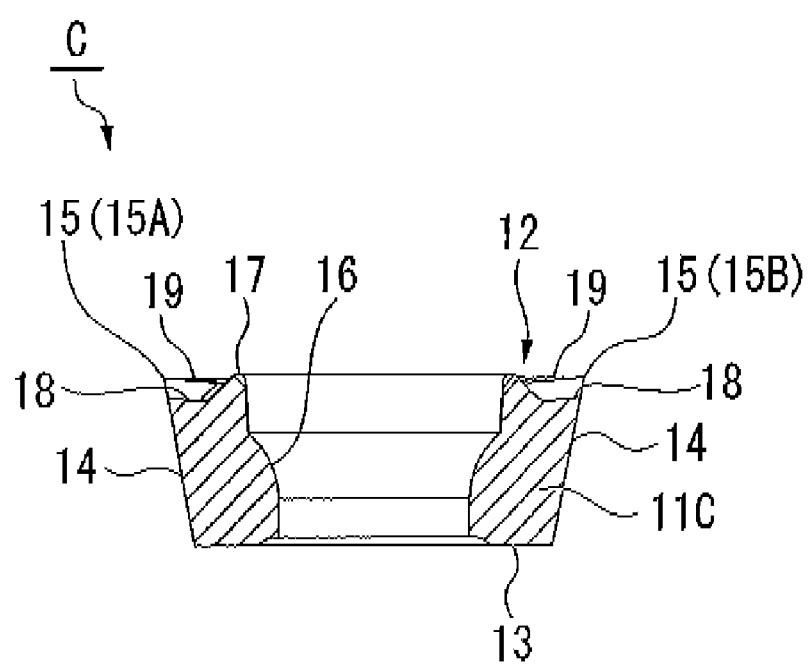
FIG. 19 is a cross-sectional view taken along a line Z-Z in FIG. 15.

In contrast, in the cutting edge 15B formed on the other long side shown at the top in FIG. 15 and in FIG. 17, conversely, the groove portions 18 of the obtuse angle corner cutting edge portions 15b are formed so as to be continuous on the obtuse angle corner portion 20B side of this cutting edge 15B with this obtuse angle corner portion 20B, and a short rectilinear portion is formed on the apex portion of the center raised portion 19 of the cutting edge 15B extending along the aforementioned single plane, and the groove portion 18 on the obtuse angle corner cutting edge portion 15b side of this center raised portion 19 is formed with a gap between itself and the acute angle corner cutting edge portion 15a. Note that different characters 17A such as, for example, [A] and [B] are provided respectively inside recessed locations formed in inside portions of the pair of acute angle corner portions 20A in the boss surface 17 of the insert C of the present embodiment so as to correspond to the providing of the waveform cutting edges 15A and 15B which are asymmetrical and have different phases in certain portions.

As is shown in FIG. 3, these inserts A through C which include the roughing insert C of the present embodiment are arranged such that two each of the inserts B and C which each have the same shape and size are mounted alternatingly in the circumferential direction in four insert mounting seats 3 which are formed at the tip of the distal end of the respective chip removal grooves 2 of the end mill body 1, and such that inserts A which also each have the same shape and size as each other are mounted in the remaining insert mounting seats 3 thereby forming an insert row in each of the chip removal grooves 2. Accordingly, in the roughing end mill of the present embodiment, two insert rows of the inserts B and A and two insert rows of the inserts C and A respectively in that sequence from the distal end side are arranged alternatingly in the circumferential direction. Note that a plurality of the inserts A are provided in each of these insert rows.

Of these, the insert mounting seats 3 at the tip of the distal end where the inserts B and C are mounted are formed as recessed portions which are open to the distal end surface and outer circumferential surface of the end mill body 1 by sufficiently hollowing out the wall surface of the chip removal groove 2 which faces in the aforementioned rotation direction T, The insert mounting seats 3 are provided with a bottom surface which faces in the rotation direction T, and with a wall surface which faces towards the distal end side of the end mill body 1 and a wall surface which faces towards the outer circumferential side of the end mill body 1. The inserts B and C are then fastened in this type of insert mounting seat 3 with the rake faces 12 thereof facing in the aforementioned rotation direction T and the seating surfaces 13 thereof being adhered to the aforementioned bottom surface, and with one acute angle corner portion 20A being positioned at the outer circumferential side of the distal end of the end mill body 1, and the cutting edge 15 which is formed on the above described long side which intersects this acute angle corner portion 20A protruding as an outer circumferential edge on the outer circumferential side of the end mill body 1 and the cutting edge 15 which is formed on the above described short side protruding as a bottom edge towards the distal end side of the end mill body 1. The pair of flank faces 14 which intersect the acute angle corner portion 20A on the opposite side from this are then seated by being butted against the aforementioned wall surfaces, and the clamp screw 4 which is inserted through the mounting hole 16 is then screwed into a threaded hole formed in the bottom surface thereby completing the fastening.

The inserts B and C which are mounted in this manner are positioned such that the positions in the O axial direction of the acute angle corner portions 20A thereof which are facing towards the outer circumferential side at the distal end of the end mill body 1, as well as the radius from the axis O of each one are equal to each other, and such that the cutting edges 15 which form the above described outer circumferential edge extend roughly in parallel with the axis O as seen from the rotation direction T side. Accordingly, the rotation trajectory around this axis o of these cutting edges 15 which form the above described outer circumferential edge forms a substantially circular cylinder shape centered on the axis O with the cutting edges 15 of the inserts B overlapping with the acute angle corner cutting edge portions 15a of the cutting edges 15 of the inserts C. Moreover, the cutting edges 15 which form the bottom edges facing towards the distal end side are slightly tilted at the same angle as each other in the inserts B and C so as to move towards the rear end side of the end mill body 1 as they move towards the inner circumferential side, and the rotation trajectories thereof around the axis O also overlap with each other.

In contrast, the insert mounting seats 3 where the inserts A of the present embodiment are mounted are formed as recessed portions which are open to the outer circumferential surface of the end mill body 1 by sufficiently hollowing out the aforementioned wall surface of the chip removal groove 2. The insert mounting seats 3 are provided with a bottom surface which faces in the rotation direction T, and with three wall surfaces, namely, a wall surface which faces towards the distal end side of the end mill body 1, a wall surface which faces towards the outer circumferential side, and a wall surface which faces towards the rear end side of the end mill body 1. The inserts A are fastened in this type of insert mounting seat 3 by the damp screws 4 in the same way as the inserts B and C with the rake faces 12 thereof facing in the aforementioned rotation direction T, and the seating surfaces 13 thereof being adhered to the aforementioned bottom surfaces, and with one cutting edge 15 protruding on the outer circumferential side as an outer circumferential edge, and with the flank faces 14 which are continuous with the remaining three cutting edges 15 then seated by being butted against the respective wall surfaces.

The inserts A which are mounted in this manner are positioned such that the one cutting edge 15 thereof which forms the outer circumferential edge extends roughly in parallel with the axis O as seen from the rotation direction T side, and such that the rotation trajectory thereof around this axis O forms a substantially circular cylinder shape centered on the axis O, with the radius thereof being equal to that of the rotation trajectories of the cutting edges 15 which form the outer circumferential edges of the inserts B and C. Note that, as is shown in FIG. 3, in the O axial direction, as they move towards the rear the rake faces 12 of these inserts A through C are inclined at a smaller angle than the twist angle of the chip removal grooves 2 towards the rear in the rotation direction T, while in the radial direction of the end mill body 1, they are inclined towards the rotation direction T side as they move towards the inner circumferential side. In addition, a positive axial rake angle and a negative radial rake angle are imparted to the cutting edges 15 which form the outer circumferential edges of the inserts A through C and to the cutting edges 15 which form the bottom edges of the inserts B and C. Naturally, a relief angle is imparted to the flank faces 14 of each cutting edge 5 in order to avoid interference between these edges and the working surface.

In addition, the above described inserts A are placed such that, as is shown in FIG. 3, insert rows which are adjacent to each other in the circumferential direction are offset from each other in the O axial direction. Furthermore, one insert A of one insert row and an insert A of another insert row which is offset therefrom in the O axial direction are positioned such that the waveforms of the waveform cutting edges which are formed by the cutting edges 15 which form the outer circumferential edges of these inserts have phases which are continuous in a rotation trajectory around the axis O. One waveform cutting edge row is formed by the waveform cutting edges 15 whose waveforms are continuous in this manner, and a plurality of these waveform cutting edge rows having different phases are formed on the outer circumference of the end mill body 1.

Specifically, in the present embodiment, as is shown in FIG. 3, the above described inserts A are positioned such that in each insert row a gap of less than one insert A is formed in the O axial direction, and in insert rows which are adjacent to each other in the circumferential direction, the inserts A of one of these adjacent inserts rows are positioned in the gap portions in the O axial direction between the inserts A of the other of these adjacent insert rows. Here, if the insert rows shown in FIG. 3 are taken from the left side as first through fourth insert rows S1 through S4, then, in FIG. 3, three inserts A are mounted with a gap between each one on the rearward side in the O axial direction of an insert B which is mounted at the tip of the distal end of the first insert row S1. These are taken as inserts A11, A12, and A13 in this order form the distal end side. In the same way, two inserts A21 and A22 are mounted with a gap between each one on the rearward side in the O axial direction of an insert C which is mounted at the tip of the distal end of the second insert row S2, three inserts A31, A32 and A33 are mounted with a gap between each one on the rearward side in the O axial direction of an insert B which is mounted at the tip of the distal end of the third insert row S3, and two inserts A41 and A42 are mounted with a gap between each one on the rearward side in the O axial direction of an insert C which is mounted at the tip of the distal end of the fourth insert row S4. These inserts are positioned so as to be offset from each other in the O axial direction in insert rows which are adjacent to each other in the circumferential direction.

Furthermore, the waveform cutting edges 15 which face towards the outer circumferential side of the distal end insert A11 from among the inserts A in the first insert row S1 are placed such that the positions in the O axial direction of the distal end and rear end thereof match, in this sequence moving rearwards, those of the respective waveform cutting edges 15 of the distal end insert A41 from among the inserts A of the fourth insert row S4, the second insert A32 from the distal end from among the inserts A of the third insert row S3, the second insert A42 from among the inserts A of the fourth insert row S4, and the third insert A33 from among the inserts A of the third insert row S3, and are positioned so as to be continuous on a rotation trajectory around the axis O, so that a first waveform cutting edge row is created by these waveform cutting edges 15. Meanwhile, the respective waveform cutting edges 15 of the inserts A other than the above inserts A, namely, of the distal end insert A31 of the third insert row S3, the distal end insert A21 of the second insert row S2, the second insert A12 from the distal end of the first insert row S1, the second insert A22 of the second insert row S12, and the third insert A13 of the first insert row S1 are also continuous in the same way in this sequence on a rotation trajectory around the axis O so as to create a second waveform cutting edge row.

In addition, in the present embodiment, these first and second waveform cutting edge rows are positioned such that the phases thereof are offset by half the wavelength of the waveform of each waveform cutting edge 15. Accordingly, in the roughing end mill of the present embodiment, a structure is employed in which two waveform cutting edge rows having mutually different phases are formed on the outer circumference of the end mill body 1. Note that in the above described inserts A, the inserts A11 and A31 at the distal end of the first and third insert rows S1 and S3 which are positioned behind the inserts B which have shorter long sides are positioned so as to be offset by approximately one insert A on the distal end side of the inserts A21 and A41 at the distal end of the second and fourth insert rows S2 and S4 which are positioned behind the inserts C which have longer long sides. Furthermore, the insert A31 which forms part of the second waveform cutting edge row is positioned half the wavelength of a waveform cutting edge 15 on the distal end side of the insert A11 which forms part of the first waveform cutting edge row.

Accordingly, in the present embodiment, any one insert A of these inserts A is positioned so as to form a particular waveform cutting edge row with at least one insert A of another insert row which is adjacent in the circumferential direction to the insert row where this any one insert A is located. Namely, the rear end of the waveform cutting edge 15 of the insert A11 of the first insert row S1 is continuous with the insert A41 of the fourth insert row S4 to which it is adjacent on the side of the rotation direction T, and both ends of the waveform cutting edges 15 of the inserts A41 and A42 of the fourth insert row S4 are continuous with the inserts A32 and A33 of the third insert row S3 to which they are adjacent in the rotation direction T, so as to form the first waveform cutting edge row. In the second waveform cutting edge row as well, the waveform cutting edge 15 of the insert A31 at the distal end of the third insert row S3 is continuous with the insert A21 of the second insert row S2 to which it is adjacent on the side of the rotation direction T in the circumferential direction, and the inserts A21 and A22 of the second insert row S2 are continuous with the inserts A12 and A13 of the first insert row S1 to which they are adjacent in the rotation direction T.

In contrast to this, in the present embodiment, in the first insert row S1 of the inserts A, the insert A11 at the distal end thereof forms part of the first waveform cutting edge row, while the other inserts A12 and A13 form part of the second waveform cutting edge row. Conversely, the insert A31 at the distal end of the third insert row S3 forms part of the second waveform cutting edge row, while the other inserts A32 and A33 form part of the first waveform cutting edge row. Thus, an insert A which makes up part of a different waveform cutting edge row from the other inserts A is placed in at least one insert row. In the present embodiment, because these inserts A are formed with the same shape and size, in order to form this type of layout, the gaps in the O axial direction between the inserts A11 and A12 and between the inserts A12 and A13 in the first insert row S1, and also the gaps in the O axial direction between the inserts A31 and A32 and between the inserts A32 and A33 in the third insert row S3, namely, the gaps between the insert mounting seats 3 are all made different sizes.

Furthermore, in the roughing end mill of the present embodiment, in the pair of inserts C of the present embodiment that are placed at the tip of the distal end of the second and fourth insert rows, the waveform cutting edges 15 thereof which face towards the outer circumferential side are positioned such that sides thereof where the phases of the obtuse angle corner cutting edge portions 15b are different from each other are made to face towards the outer circumferential side. Namely, in the present embodiment, these inserts C are mounted such that, of the waveform cutting edges 15A and 15B which are positioned rotationally symmetrically to each other 180° around the center line, the two obtuse angle corner cutting edge portions 15b which form a mutually asymmetrical portion thereof are made to overlap on the rotation trajectory around the O axis.

More specifically, in the present embodiment, as is shown in FIG. 3, the insert C at the tip of the distal end of the second insert row S2 is mounted such that the above described waveform cutting edge 15A faces towards the outer circumferential side, while the insert C at the tip of the distal end of the fourth insert row S4 is mounted such that the above described waveform cutting edge 15B faces towards the outer circumferential side. Accordingly, in these inserts C, the obtuse angle corner cutting edge portions 15b of the respective waveform cutting edge portions 15A and 15B are also placed such that the phases thereof are offset by half the wavelength of the waveform of each obtuse angle corner cutting edge portion 15b. Accordingly, two waveform cutting edges having mutually different phases are formed on the outer circumference of the end mill body 1.

Note that, of the inserts A, the inserts A11 and A31 of the first and third insert rows S1 and S3 which are positioned on the distal end side are positioned such that, on the rotation trajectory, the waveform cutting edges 15 thereof are either continuous with or overlap the waveform cutting edges 15A and 15B of these inserts C of the present embodiment at the tip of the distal ends of the second and fourth insert rows S2 and S4. Namely, the insert A11 of the first insert row S1 is positioned such that the distal end of the waveform cutting edge 15 thereof and the rear end of the waveform cutting edge 15B (i.e., the rear end of the obtuse angle corner cutting edge portion 15b) of the insert C of the fourth insert row S4 which is located on the rotation direction T side have mutually matching phases on the rotation trajectory. Moreover, the insert A31 of the third insert row S31 is positioned such that the distal end of the waveform cutting edge 15 thereof and the apex portion of the raised portion 19 on the obtuse angle corner portion 20b side of the obtuse angle corner cutting edge portion 15b of the insert C at the tip of the distal end of the fourth insert row S4 match each other on the rotation trajectory, and this insert C and the insert C at the tip of the distal end of the fourth insert row S4 are positioned such that the waveform cutting edges 15 overlap each other.

In a roughing end mill having the above described structure, the inserts A through C which make up the plurality of insert rows S1 through S4 are positioned apart from each other in the O axial direction, and, of these, a portion of the inserts A are positioned so as to be offset from each other in the O axial direction in insert rows S1 through S4 which are adjacent in the circumferential direction. As a result, it is naturally possible to cut chips into fragments in each of the inserts A through C, and because the waveform cutting edges 15 which undulate in the O axial direction protrude on the outer circumferential side of the end mill body 1, it is also possible in each one of the inserts A through C to fragment and create the chips themselves and thereby achieve a reduction in the cutting resistance and an improvement in chip processability.

Furthermore, in particular, in this portion of the inserts A, because the waveform cutting edges 15 thereof make up a waveform cutting edge row in which the phases of the respective waveform cutting edges 15 are continuous along a rotation trajectory around the axis, and a plurality of (two in the present embodiment) these waveform cutting edge rows having mutually different phases are formed on the outer circumference of the end mill body 1, it is possible to obtain a smooth processing surface by, for example, using the raised portions of a second waveform cutting edge row to cut the raised portions of an opposite-phase waveform cross section which have been formed on a work processing surface by a first waveform cutting edge row. The result of this is that, in spite of the processing being only roughing, namely, rough processing, it is possible to perform comparatively smooth, high quality cutting of a processing surface.

In contrast to this, the respective inserts B and C are mounted at the tips of the distal end of the respective insert rows S1 through S4, and these inserts B and C are positioned such that the rotation trajectories around the axis O of the waveform cutting edges 15 thereof which are facing towards the outer circumferential side overlap due to the phases of the inserts B and the acute angle corner cutting edge portions 15a of the inserts C being offset by half a wavelength, and such that the rotation trajectories of the cutting edges 15 thereof which form bottom edges also overlap. In addition, these cutting edges 15 which form bottom edges also have a waveform edge shape, and the phases thereof are also mutually offset by half a wavelength in the inserts B and C. Because of this, even when, for example, a processing surface having an L-shaped cross section is being formed in a work piece, it is possible to prevent an excessive load being applied to the inserts B and C at the tip of the distal end, and the chips which are created by the cutting edges 15 which form a bottom edge can also be efficiently fragmented and processed. Furthermore, a bottom surface of the L-shaped processing surface which is formed by this can also be made to a high quality.

In a roughing insert C of the present embodiment in which the waveform cutting edges 15A and 15B which form outer circumferential edges are longer than in an insert B, and the two obtuse angle corner cutting edge portions 15b of a portion thereof perform cutting between the inserts A and B on the distal end side of the first and third insert rows S1 and S3, as is described above, the two waveform cutting edges 15A and 15B which are formed at positions which are rotationally symmetrical every predetermined angle (180°) around the center line which forms a reference line of the insert body 11C are formed asymmetrically so as to not match each other when the two obtuse angle corner cutting edge portions 15b which form a portion of the waveform cutting edges 15A and 15B cause the insert body 11C to rotate by the aforementioned predetermined angle. Accordingly, in the roughing end mill of the present embodiment in which two of these inserts C are mounted such that these two asymmetrical obtuse angle corner cutting edge portions 15b overlap each other on a rotation trajectory around the O axis, even if the inserts C are mounted at the tip of the distal end of the end mill body 1 and the mounting positions thereof are the same in the O axial direction, it is possible using one type of inserts C which have the same shape and size to prevent the rotation trajectories of the obtuse angle corner cutting edge portions 15b of each one from matching, and to make a processing surface formed on a work piece even smoother and obtain an improvement in surface roughness.

In this case, if, for example, this insert C is formed so as to be rotationally symmetrical 180° around the center line in the same way, for example, as the insert B at the tip of the distal end of the same end mill body 1, then two types of inserts C become necessary in order to prevent the rotation trajectories of the waveform cutting edges 15 of the inserts C from matching in the portions between the insert B and the inserts A 11 and A31 of the same insert rows S1 and S3. Accordingly, two types of metal mold are also required to mold a green compact from cemented carbide raw powder in order to manufacture these inserts C so that there is also an increase in manufacturing costs. Moreover, if the number of insert types increases, the control thereof also becomes more complex which requires considerable labor. In addition, even if the cutting edges 15 of these two types of inserts C are different, because they have a similar shape when viewed casually, there is a possibility that the same type of insert C will end up being mounted in the second and fourth insert rows S2 and S4 resulting in it becoming impossible to obtain the desired surface roughness.

However, in contrast to this, according to the roughing insert C and roughing end mill of the present embodiment, because only one type of insert C is needed, it is possible to achieve a massive reduction in manufacturing costs and in the labor required for the control thereof, while achieving an improvement in the surface roughness of a work piece even in those portions between the inserts B and the inserts A11 and A31 in the first and third insert rows S1 and S3 as is described above. Moreover, in the present embodiment, because the characters 17A are provided on the boss surface 17 of this insert C, there are few errors made when choosing between the waveform cutting edges 15A and 15B to be used as the outer circumferential edge in each insert C.

Furthermore, in the insert C having the above described structure, even if the wrong waveform cutting edge 15A or 15B to be used as the outer circumferential edge is placed in either one of the two inserts C, and the roughing end mill becomes mounted such that the two obtuse angle corner cutting edge portions 15b which form a portion thereof trace the same rotation trajectory, because these obtuse angle corner cutting edge portions 15b have a waveform with a smaller wavelength than the acute angle corner cutting edge portions 15a which are the remaining portions of the waveform cutting edges 15A and 15B in the same insert C, and a smaller wavelength than the waveform cutting edge 15 of the insert B, the interval (i.e., the pitch) between undulations which is transferred onto a processing surface is smaller than the intervals between undulations formed by the waveform cutting edges 15 of both the acute angle corner cutting edge portions 15a and the cutting edges 15 of the inserts B. Accordingly, it is possible to avoid the formation of a processing surface having a conspicuously large level of roughness.

In particular, in the present embodiment, because the wavelengths of the waveforms formed by the obtuse angle corner cutting edge portions 15b are half those of the acute angle corner cutting edge portions 15a, even if, by some chance, the rotation trajectories of two obtuse angle corner cutting edge portions 15b were to coincide in two inserts C, because the interval between undulations formed on the processing surface is also half the undulation of one wave of the acute angle corner cutting edge portions 15a and the cutting edges 15 of the inserts B, and the acute angle corner cutting edge portions 15a of the inserts C and the intervals between undulations formed on the processing surface by the cutting edge 15 of the inserts B are substantially equivalent, it is possible to more reliably prevent any deterioration in surface roughness. Accordingly, according to the roughing insert C having the above described structure, even if a mounting error occurs, it is not necessary to set a substantial allowance in finishing processing in subsequent steps, and it becomes possible to achieve efficient cutting processing.

Moreover, in the inserts C of the present embodiment, in obtuse angle corner cutting edge portions 15b which form a portion of a waveform cutting edge 15, in addition to the wavelength, the amplitude as well is smaller than, namely, is half that of the acute angle corner cutting edge portions 15a which are the remaining portions, Accordingly, if a mounting error occurs, the depth of the recessed portions formed in the processing surface by these obtuse angle corner cutting edge portions 15b as well is shallower, namely, is half the depth of the recessed portions formed by the acute angle corner cutting edge portions 15a and the cutting edges 15 of the inserts B. Because of this, the roughness of the processing surface can be restricted to substantially the same level of roughness as that obtained when the rotation trajectories of the acute angle corner cutting edge portions 15a in two inserts C are offset by half a phase of the wavelength thereof, and it becomes possible to more reliably suppress any deterioration thereof.

Furthermore, in the roughing insert C of the present embodiment, the obtuse angle corner cutting edge portions 15b, which are a portion of a waveform cutting edge 15 whose wavelength and amplitude have been made smaller in the manner described above, are formed at rotationally symmetrical positions of one insert body 11C which is formed so as to be rotationally symmetrical around the center line thereof. These obtuse angle corner cutting edge portions 15b are formed asymmetrically so as not to coincide with each other when the insert body 11C is rotated by a predetermined angle around the center line thereof. In the roughing end mill of the present embodiment, when the mounting is performed correctly, these two inserts C are mounted such that the waveform cutting edges 15A and 15B which include the mutually asymmetrical obtuse angle corner cutting edge portions 15b are each facing towards an outer circumferential side.

Accordingly, even if, by some chance, an error was made and the wrong insert C was mounted, then when this error is noticed and the inserts C are remounted such that the correct waveform cutting edges 15A and 15B form the outer circumferential edges, or when a cutting edge 15 is worn down by cutting and is replaced by an unused cutting edge 15 from another corner, then in the present embodiment, it is not necessary to completely remove the clamp screw 4 and it only needs to be undone until the insert C can be rotated 180° around the center line and then retightened. It is thus possible to avoid the possibility of the clamp screw 4 being lost after being removed or of the insert C being dropped. Note that a space is secured on the inner circumferential side of the chip removal groove 2 adjacent to an insert mounting seat 3 in order for an insert C to be rotated while the clamp screw 4 is still screwed in. This is the same for the other inserts A and B as well.

Note also that, as is described above, in order to form the obtuse angle corner cutting edge portions 15b, which form a portion of the two waveform cutting edges 15A and 15B which are positioned rotationally symmetrically, such that they are asymmetrical and do not match each other when the insert body 11C is rotated around the reference line (i.e., the above described center line) by a predetermined angle, it is sufficient if, for example, they are formed having waveforms with different wavelengths and amplitudes, and are formed such that when they are made to overlap each other their mutual waveforms counteract each other. However, by forming them such that their respective wavelengths and amplitudes are mutually the same but the phases thereof are mutually offset so that they are mutually asymmetrical, as is the case in the present embodiment, the cutting amount in the two obtuse angle corner cutting edge portions 15b of each insert C can be made substantially equal, and it is possible to achieve uniform cutting resistance between the inserts C. This promotes stable cutting, and achieves uniform wear between the obtuse angle corner cutting edge portions 15b, and also makes it possible to coincide the timings of switching corners and replacing an insert C.

In particular, in the present embodiment, the waveforms of these obtuse angle corner cutting edge portions 15b are formed such that the wavelengths and amplitudes thereof are the same and such that the phases thereof are offset by half a wavelength when the insert body 11C is rotated 180° around the center line, and the inserts C are mounted such that these obtuse angle corner cutting edge portions 15b having mutually different phases are positioned alternatingly in the circumferential direction of the end mill body 1. As a result, the raised portions in a processing surface left behind after cutting by the groove portions 18 of the waveform of an obtuse angle corner cutting edge portion 15b of one insert C can be cut away by the raised portions 19 of the waveform of the obtuse angle corner cutting edge portion 15b of the other insert C which follows on behind the one insert C as a result of the rotation of the end mill body 1. Accordingly, it is possible to form a smooth processing surface without needlessly increasing the number of insert types.

In contrast to this, in the insert C of the present embodiment, when the insert body 11C is rotated by a predetermined angle around the reference line, of the rotationally symmetrically positioned waveform cutting edges 15A and 15B, except for these obtuse angle corner cutting edge portions 15b which have been formed asymmetrically such that they do not match each other, the remaining acute angle corner cutting edge portions 15a have been formed symmetrically such that they do match each other. Accordingly, if the waveform cutting edges 15 of the inserts B which have placed alternatingly between these inserts C so as to overlap each other are formed, for example, having the same wavelength but having phases which are mutually offset by half a wavelength such that they do not coincide with the acute angle corner cutting edge portions 15a on a rotation trajectory, then according to the present embodiment, it is possible to perform cutting using a total of four of the inserts B and C which are provided at the distal end of the end mill body 1 as is described above. It is also possible to reduce the load which is applied to each one of the inserts B and C and achieve an improvement in the quality of the processing surface.

INDUSTRIAL APPLICABILITY

The present invention relates to a roughing insert which includes: an insert body; and a waveform cutting edge which is formed on an intersecting ridge line portion between a rake face and a flank face of the insert body, and which undulates along this intersecting ridge line portion, wherein the waveform cutting edges are formed such that a portion thereof has a smaller wavelength than the remaining portion thereof. According to the roughing insert of the present invention, it is possible to prevent any conspicuous deterioration in surface roughness even if a mounting error occurs when inserts having a long cutting edge length are mounted erroneously on the above described type of roughing end mill, at the same time as a sufficient reduction in resistance and improvement in chip processability are able to be achieved.

The invention claimed is:

1. A roughing insert comprising:
an insert body with a substantially parallelogram shape; and
waveform cutting edges which are formed on an intersecting ridge line portion between a rake face and a flank face of the insert body, and which undulate along this intersecting ridge line portion, wherein
each of the waveform cutting edges, which are formed on the intersecting ridge line portion of a long side of the parallelogram, is formed such that a portion, which is located between an apex point and an obtuse angle corner portion of the intersecting ridge line portion has a smaller wavelength than the remaining portion, which is located between the apex point and an acute angle corner portion of the intersecting ridge line portion.

2. The roughing insert according to claim 1, wherein
each of the waveform cutting edges is formed such that the wavelength of the portion with the obtuse angle corner is half the wavelength of the remaining portion.

3. The roughing insert according to claim 1, wherein
each of the waveform cutting edges is formed such that the portion with the obtuse angle corner has a smaller amplitude than the remaining portion.

4. The roughing insert according to claim 3, wherein
each of the waveform cutting edges is formed such that the amplitude of the portion with the obtuse angle corner is half the amplitude of the remaining portion.

5. The roughing insert according to claim 1, wherein
the waveform cutting edges are formed on the insert body respectively at positions which are rotationally symmetrical at predetermined angular intervals around a reference line of the insert body, and these waveform cutting edges which are positioned rotationally symmetrically to each other are formed such that, when the insert body is rotated by the predetermined angle around the reference line, the portions of the waveform cutting edges do not match each other and are mutually asymmetrical.

6. A roughing insert comprising:
an insert body; and
waveform cutting edges which are formed on an intersecting ridge line portion between a rake face and a flank face of the insert body, and which undulate along this intersecting ridge line portion, wherein
each of the waveform cutting edges is formed such that a portion thereof has a smaller wavelength than the remaining portion thereof,
the waveform cutting edges are formed on the insert body respectively at positions which are rotationally symmetrical at predetermined angular intervals around a reference line of the insert body, and these waveform cutting edges which are positioned rotationally symmetrically to each other are formed such that, when the insert body is rotated by the predetermined angle around the reference line, the portions of the waveform cutting edges do not match each other and are mutually asymmetrical, and
the portions of the rotationally symmetrically positioned waveform cutting edges are made asymmetrical when the insert bodies are rotated by the predetermined angle around the reference line by offsetting phases thereof while making the wavelength and the amplitude thereof mutually equal.

7. The roughing insert according to claim 6, wherein the phases are offset by half the wavelength of a portion of the waveform cutting edges.

8. The roughing insert according to claim 5, wherein
the waveform cutting edges which are positioned rotationally symmetrically to each other are formed such that, when the insert bodies are rotated by the predetermined angle around the reference line, the remaining portions do match each other and are mutually symmetrical.

9. A roughing end mill comprising:
an end mill body; and
a plurality of roughing inserts which are removably mounted apart from each other in the circumferential direction on an outer circumference of the end mill body which rotates around an axis, wherein
at least two of the roughing inserts according to claim 1 are mounted such that the portions of the waveform cutting edges are made to overlap each other in the axial direction.

10. The roughing end mill according to claim 9, wherein
the portions of the waveform cutting edges are made to overlap each other without the rotation trajectories thereof around the axis coinciding.

* * * * *